United States Patent Office 3,283,527
Patented Nov. 8, 1966

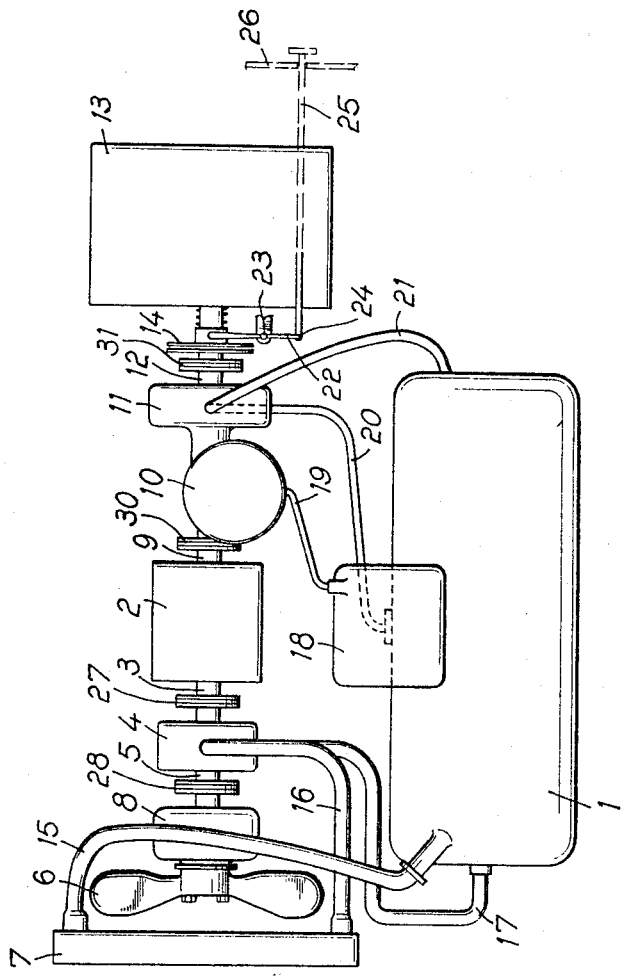

3,283,527
APPARATUS FOR DRIVING THE AUXILIARY DRIVEN DEVICES OF AN INTERNAL COMBUSTION ENGINE, PARTICULARLY FOR AN AUTOMOBILE
André Cauvin, Port-Marly, France, assignor to Société Anonyme Simca Automobiles, Paris, France
Filed Feb. 1, 1965, Ser. No. 429,258
Claims priority, application France, Jan. 30, 1964, 962,033
5 Claims. (Cl. 62—183)

The present invention relates to apparatus for driving the auxiliary driven devices of an internal combustion engine, particularly for an automobile.

Internal combustion engines fitted to automobiles have undergone only a few changes during their development, and particularly so far as concerns the driving of the auxiliary devices used for keeping the engine running correctly. Such devices normally include a fan for a radiator containing coolant fluid for keeping the engine cool, a water pump, a fuel pump and a lubricating oil pump and these devices are mechanically driven by the main engine of the vehicle, by means of belt or gear transmissions.

This method of driving the auxiliary devices has, up to the present, given satisfaction with engines running at low operating speeds. However, during the last few years, the improvements made in piston engines in mass-production have enabled the operating speed of these engines to be increased considerably so that now this speed frequently exceeds seven thousand revolutions per minute. The result is that the auxiliary devices normally driven from the crank-shaft of the engine, are driven at speeds which may be harmful for their continued satisfactory operation. On the other hand, it is not appropriate to reduce the operating speed of these devices by using reduction gears, because it is necessary to ensure that the auxiliary devices operate at sufficient speed during slowing down and for low operating engine speeds as during normal use of an automobile, in order to enable the engine to function in good conditions. Consequently, it is not possible to obtain in this way a rational use of these auxiliary devices which have an optimum efficiency for a predetermined speed, being given the great speed variations of the engine itself. It may thus be stated, for example, that the fan and the pumps exceed their optimum speeds at high engine speeds, which manifest by boiling of the coolant and cavitation therein which militates against the efficient circulation of the coolant liquids, and in certain cases, may harm the cooling or the lubrication of the engine.

On the other hand, for very high engine speeds, the consumption of power resulting from the driving of the auxiliary devices represents a large fraction of the power available at the crank shaft, and may reach about one fifth or one quarter thereof.

In addition, it is obvious that these speeds, which are too high, produce vibrations in the auxiliary devices which are incompatible with the silent operation sought for at the moment by all designers. These vibrations may also cause a premature wear of these devices and the loosening or the breaking of their holding-down means.

The invention, consists in apparatus for driving the auxiliary driven devices of an internal combustion engine, particularly for an automobile, said apparatus comprising at least one electric motor supplied by an electric circuit associated with the member driven by said engine, whereby said electric motor operates at a constant speed, independently of the internal combustion engine.

The invention also consists in an internal combustion engine, particularly for an automobile, including such apparatus.

The D.C. clutch motor, supplied from the electric circuit of the vehicle, drives all the auxiliary devices at an optimum efficiency for all the operating engine speeds of the vehicle and ensures a good functioning of said latter.

Apart from the auxiliary devices mentioned above, this electric motor may also be used for driving the fan of an air conditioning device, avoiding the necessity of fitting a separate motor provided ordinarily for this purpose.

Since the electrical motor operates continuously it is advisable to provide a clutch controlled by a thermostat between the electric motor and the radiator fan in order to drive the fan only when this is necessary by the temperature of the coolant liquid circulating in the radiator.

The fan of the air-conditioner also preferably comprises a manually, electromagnetically or thermostatically controlled clutch, which enables it to be actuated as desired by the passengers of the vehicle, dependent on the temperature of the vehicle.

In order that the invention may be more clearly understood, reference will now be made to the accompanying drawing, showing one embodiment thereof by way of example.

The drawing diagrammatically shows an internal combustion engine 1 for driving an automobile and the apparatus according to the invention for driving the auxiliary devices of the engine.

The driving apparatus is constituted by an electric motor 2, one of the ends 3 of whose driving shaft is connected through a clutch 27 to a control shaft of a water pump 4, which, in its turn drives a fan 6 through an extension of a shaft 5 and through a clutch 28, the fan 6 being located behind a coolant water radiator 7 of the engine 1. A thermostatically controlled clutch 8 is arranged between the fan and the water pump 4. Through the other end 9 of its shaft, the electric motor 2 drives, through a clutch 30, a fuel pump 10 and a lubrication pump 11. The shaft of the lubrication pump is extended at its end 12 in order to control, through a coupling member 31, the fan of an air-conditioner 13 and through a clutch 14, manually controllable by a lever 22 mounted so as to pivot on a support about a pivot 23, one of the ends 24 of the lever 23 being articulated to the end of a control rod 25 actuated from the dash-board 26 of the vehicle. This control device could also be constituted by an electromagnetic or thermostatic member.

In this way, the electric motor 2 controls all the auxiliary members however, the representation of the drawing is schematic and it is obvious that the described arrangement, where the members are controlled in series, may be modified by using an intermediate transmission between the electric motor shaft and the driven device, as for example a belt, or a gear or chain-drive.

The radiator 7 is connected to the water jacket of the engine 1 through a hose 15 and to the water pump through a hose 16, the water pump itself being connected to the water jacket of the engine by a hose 17. A petrol pump 10 supplies a carburetor 18 through a pipe 19; and an oil pump 11 is connected to an oil tank, forming part of the casing of the engine 1, by means of pipes 20 and 21.

The electric motor 2 is supplied in a known manner by a generator (not shown) driven by the internal combustion engine for charging a battery.

In the case where the generator is an alternator, its output is almost always sufficient to ensure the supply of the electric motor 2 and is more efficient than a dynamo.

The speed of the electric motor 2 is controlled and adjusted by known means, in order to remain within a small range of speeds as low as possible to take into account the operational requirements of all the auxiliary devices.

The operation of the apparatus according to the invention is as follows:

As soon as the ignition key is actuated for switching on the ignition members of the engine before starting off, the engine 2 is supplied with electric current by the battery and it begins to operate, ensuring a supply of fuel, correct lubrication and the circulation of the coolant liquid, so as to enable the engine to operate under normal conditions.

When the motor turns and the normal temperature of the engine is exceeded, the clutch 8, controlled by a thermostat, sensitive to the temperature of the coolant liquid of the engine, is actuated and it automatically engages the fan 6. If, in the course of operation, the temperature of the engine returns to its normal value, the thermostatic control device automatically ensures that the fan 6 is disengaged. The considerable loss of energy which would be produced with a constant driving of the fan, is thus avoided.

On the other hand, if the passengers desire to use the air conditioner of the vehicle, the driver need only switch on the air conditioner by means of a manual control which acts on the clutch 14 and ensures the driving of the fan of the air conditioner 13. This method of driving the air conditioner avoids the necessity to use a separate motor for said latter.

I claim:

1. In a vehicle having an internal combustion engine and a plurality of auxiliary devices including an air conditioner and a radiator fan, the improvement comprising an electric motor mounted on said vehicle to operate independently of said engine, a shaft driven by said electric motor, a first clutch means for operatively connecting said shaft to said radiator fan, a thermostatic device for actuting said clutch means in response to a predetermined radiator temperature and a second clutch means for operatively connecting said shaft and said air conditioner.

2. The improvement of claim 1 further comprising a coupling means for directly coupling said shaft with the additional auxiliary devices.

3. The improvement of claim 1 further comprising means to actuate said second clutch means.

4. The improvement of claim 3 wherein said means to actuate said second clutch means is manually operable.

5. The improvement of claim 3 wherein said means to actuate said second clutch means comprises an additional thermostatic device.

References Cited by the Examiner

UNITED STATES PATENTS

| | | | |
|---|---|---|---|
| 1,662,723 | 3/1928 | Snow | 236—35 |
| 1,900,586 | 3/1933 | Rippe | 236—35 |
| 2,019,476 | 11/1935 | Brownlee | 236—35 |
| 2,099,227 | 11/1937 | Peo | 62—244 |
| 2,784,562 | 3/1957 | Gamundi | 62—244 |

WILLIAM J. WYE, *Primary Examiner.*